United States Patent Office 3,188,280
Patented June 8, 1965

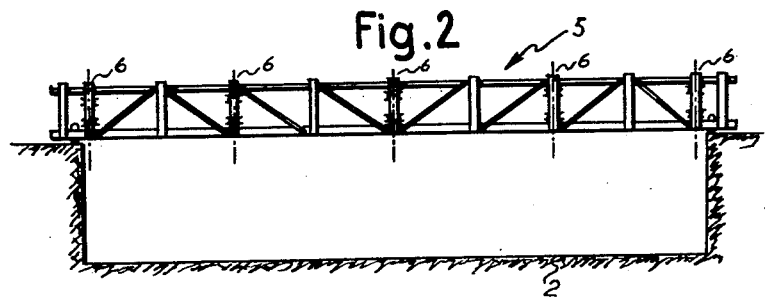
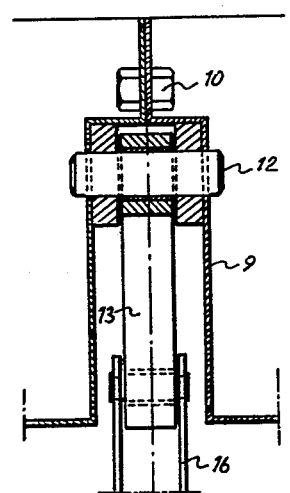
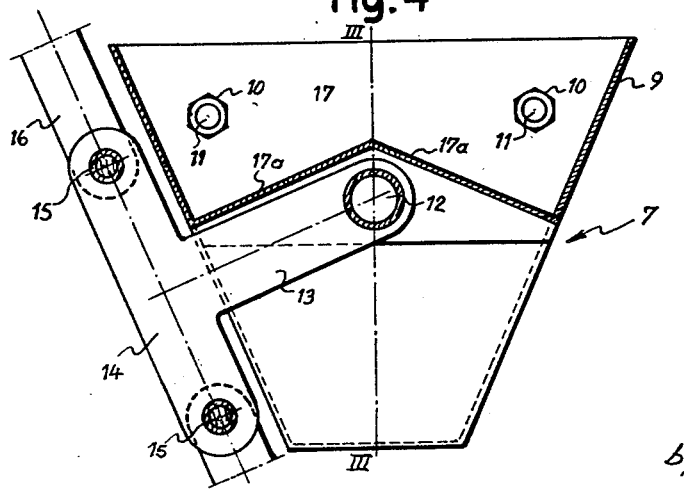

3,188,280
DEVICE FOR A COMBINED STEEPING AND
GERMINATING MULTI-PROCESS
Henri Vilain, 7 Spitzackerstrasse, Bottmingen,
Basel-Land, Switzerland
Filed Dec. 27, 1962, Ser. No. 250,730
Claims priority, application France, Dec. 29, 1961,
883,456, Patent 1,320,049
1 Claim. (Cl. 195—130)

The present invention relates to a malting process with combined steeping and germinating.

Until the present time, known malting processes have consisted of the following stages: steeping, germinating, kilning.

During the steeping process, the grain is completely immersed in water, irrespective of the method or apparatus employed, over a fairly substantial period of time totalling approximately 15 hours under water with periods of continuous immersion of at least two hours. The steeping process is followed by the germinating process, which is conducted in different types of equipment and in different rooms.

In actual fact, the grain in nature is not intended to live under water in the first place, while in the second place, the factors of vital activity are: water, temperature, oxygen and carbon dioxide. These factors must accordingly be considered all together and not individually and separately. Since the traditional process does not conform to natural laws, it has occurred to me that it is advantageous:

(1) To reduce the time of each treatment under water in such manner as to obtain periods of immersion of less than 30 minutes, for example;

(2) To initiate and direct the germination before the steeping treatment proper is terminated by carefully controlling the other factors of germination: temperature, oxygen and carbon dioxide;

(3) To continue the steeping treatment during the germination itself and thus to permit the maltster to direct the processes which result from the germination of the grain by modifying the moisture content of this latter.

It is a main object of my invention to eliminate the practically absolute separation which had hitherto been observed between the steeping and germinating processes.

This and other objects are accomplihhed in accordance with the present invention by a combined steeping and germinating process which essentially consists, while at the same time maintaining the regularity of germination as required by the art, in increasing with controlled precision the moisture of the grain between the commencement of steeping up to the kilning stage by virtue of a moistening treatment performed on a small quantity of grain under the same conditions of temperature, oxygen and carbon dioxide as those which prevail during a germinating process of known type, in such manner as to cause the germination to commence as soon as possible with the minimum quantity of water.

In accordance with a further feature which may be provided by the present invention, the moistening treatment performed on small quantities of grain is carried out on the grain in a fine layer.

Device useful for the practical application of the above process comprises a germinating bin, means for displacing the grain in the said bind in such manner that the said grain circulates in a small volume and means for moistening the grain during its displacement.

The device referred to above may comprise one or a number of the following features:

(a) The means for displacing the grain in such manner that the said grain circulates in a small volume consist of at least one continuous-movement bucket-chain, the top run of which is horizontal;

(b) Means are provided for preventing the grain from coming into contact with the chain, so that the moistened grain is not crushed by the toothed wheels and the chains;

(c) The means in accordance with section (b) above consist of a housing located beneath the buckets, to which the grains cannot gain access and inside which the chain moves;

(d) The means for moistening the grains consist of a series of sprinkling orifices located above the horizontal run of the bucket-chain along which the immersion of the grain in water takes place for a very short period of time which is less than five minutes;

(e) The means for moistening the grains consist of a series of water sprayers or atomizers which are placed in such manner that the grains are moistened as and while they freely drop downwards after having been discharged from the buckets, thereby satisfying the condition which requires that this moistening operation should be quite homogeneous and uniform.

In order that the invention may be more clearly understood, there will first be described below by way of non-limitative example one form of embodiment of the device for the practical application of the process in accordance with the invention, reference being made to the accompanying drawings to different scales, in which:

FIG. 2 is a diagrammatic transverse cross-section of the germinating bin showing the overhead travelling bridge which carries the device referred to above;

FIG. 3 is a transverse cross-section taken along the line III—III of FIG. 4 which passes through the junction of two buckets of the device referred to above; and FIG. 4 is a side view of a bucket.

Figure 1:
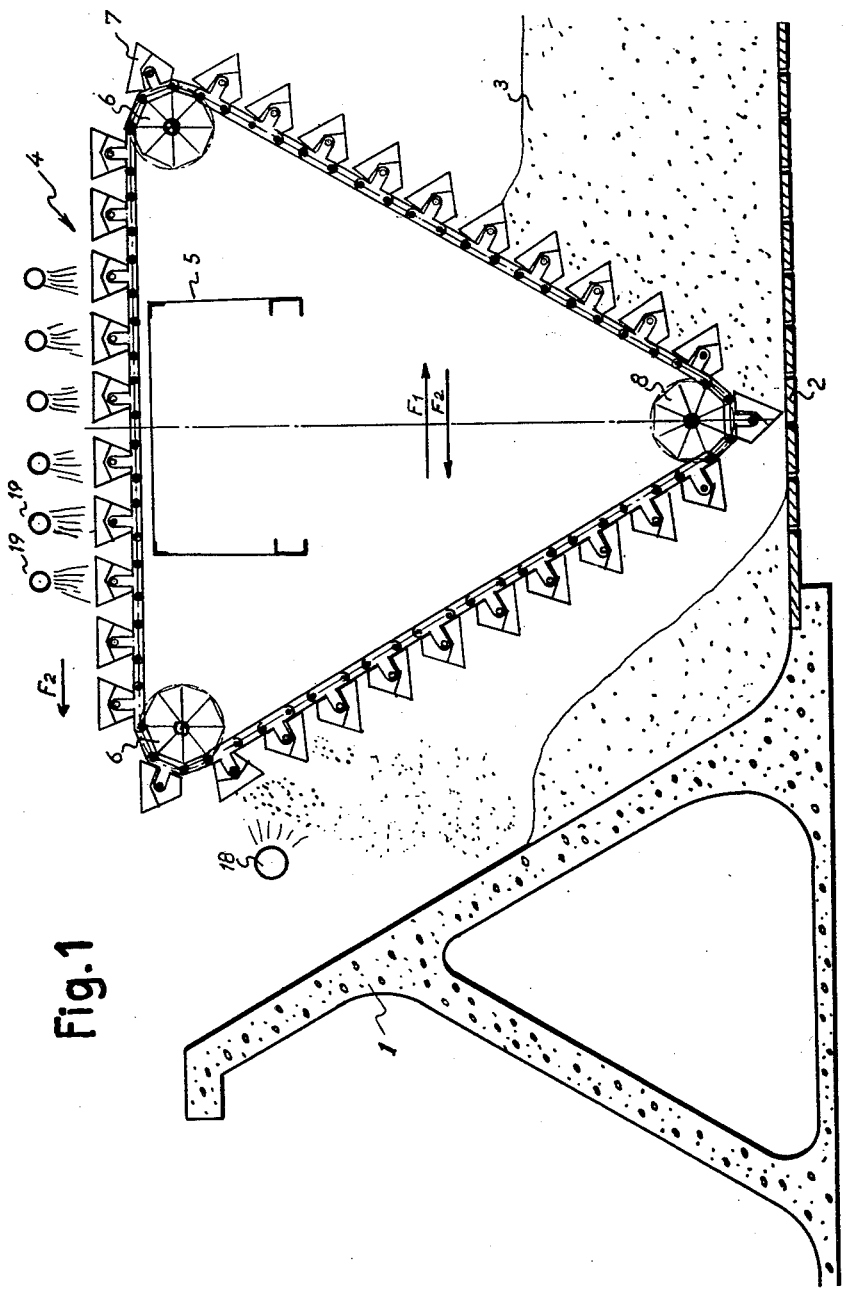
FIG. 1 illustrates in partial longitudinal cross-section a germinating bin in which is mounted a device for displacing and wetting the grain.

The germinating bin, of which FIG. 1 is a partial longitudinal cross-section, has been illustrated diagrammatically by a screen 1 of concrete and by a perforated base 2. A bucket-chain device 4 having a generally triangular shape is adapted to move in the barley which is designated by the reference 3, and is mounted on an overhead travelling bridge 5 in such manner that the top run of the said bucket-chain is horizontal.

The said travelling bridge is provided with five toothed wheels 6 over which pass five bucket-chains. Between the said five chains are mounted buckets 7 each having, for example, a length of 2.5 metres in such manner as to sweep the full width of the bin, namely, a width of approximately 10 metres. Each chain also passes over a bottom toothed wheel 8, as shown in FIG. 1, with the result that the combined unit has the shape of an isoceles triangle, the apex of which is located at the bottom. For the sake of clarity, there has not been shown in the drawings the system of assembly of the bottom pulleys, which obviously move at the same time as the overhead travelling bridge to which they are coupled.

In short, the device comprises four groups of buckets which are each supported between two chains, the buckets being coupled together in such manner that four buckets placed horizontally in line one after another make up one unit. It will naturally be understood that it would be possible to devise a single bucket of appropriate length for the purpose of sweeping the full width of the bin. It has been found preferable to adopt the solution of bucket elements which are secured to each other solely for the purpose of facilitating construction. However, this solution could give rise to a disadvantage in that, if no precautions were taken, the moistened grains would come into contact with the chains and would accordingly be crushed between the toothed wheels and the chains.

In order to overcome the above-mentioned disadvantage, provision has been made to isolate the chain with respect to the buckets. To this end, the buckets are coupled to each other in the horizontal direction by a fork joint 9. The said fork joint is formed by two thick folded plates, the free extremities of which are applied one against the other, for example by means of two nuts 10 which are secrewed onto a bolt 11 which passes through the two plates. There has thus been formed in the interior of the fork joint a housing in which is mounted a spindle 12 which supports the fork joint and consequently the buckets. On the said spindle is pivotally mounted the stem 13 of a T-piece 14 which is fixed at 15 on one of the chains 16.

As shown in FIGS. 3 and 4, those grains which are liable to fall on the top portion of the fork joint 9 which forms a kind of half-bucket 17 are unable to reach the chain 16. Furthermore, by virtue of the double slope of the bottom 17a, 17a of the half-bucket 17, the grains which are subsequently deposited therein will readily be evacuated therefrom as and when the bucket swings over.

In accordance with the form of embodiment which is illustrated in FIG. 1, the shape of the screen 1 closely corresponds to the path which is described by the end portions of the buckets. It will be understood that the travelling bridge which starts from the left hand side of the drawing, for example, moves forwards in the direction of the arrow $F_1$, while the chain accordingly moves in the direction of the arrow $F_2$ along the horizontal run of the said chain. The buckets tilt over when they arrive at the top and on the left hand side as shown in the figure, by virtue of an abutment member which has not been illustrated. The said buckets are then overturned by means of a guide shoulder which has not been illustrated in the drawings. At the moment when each bucket tilts over, the grains fall downwards freely, pass beneath a moistening apparatus 18 of known type and then form a new pile as shown on the left hand side of the figure.

It should be noted that the angle of slope of the upwardly moving and downwardly moving chains is such that, after the free drop of the grains has taken place, these latter cannot be caught up again by the buckets.

The above-mentioned process continues until the overhead travelling bridge reaches the right hand extremity of the bin with reference to the figure. At this moment the travelling bridge and the chains perform a reverse movement, the said bridge accordingly moving in the direction $F_2$ while the bucket-chains move in the direction $F_1$.

If it is desired to moisten the grain by immersion over a very short period of time which is less than five minutes, provision is made for the use of a plurality of sprinkling orifices 18 which are located above the chains. The buckets which already contain grain are then filled with water.

As will be understood, at the commencement of the operation and after the first pile has been formed, each grain is covered over with water and has received a quantity of water which is sufficient for the germination to commence. It has naturally been ensured that, prior to the operation in accordance with the invention, the grain has been immersed and washed by a certain number of operations involving the filling and emptying of water either in the germinating bin itself or in another tank, such operations having been carried out over a period of a few hours in order to rid the grain of its inhibiting substances. After this preparation, the grain has been removed from the tank if another tank was employed and then placed in the bin in which is located the device in accordance with the invention so that the grain may thus be placed under all the optimum conditions of germination.

The grain thus begins to sprout and this increase in vital activity is maintained by causing the device to operate in such manner as to provide very brief immersions or aspersions of water while supplying fresh air at a suitable temperature.

The moisture of the grain accordingly increases, and this increase in moisture is accompanied by a corresponding increase in the development of the respiratory process and the degree of germination of the grain as well as in the formation of enzymes in the grain. During this stage, when the awakening of vital activity takes place in all its forms, water exercises its activating function both on the life of the germ and on the enzymes. The fact must not be overlooked that the object in view is to achieve a certain degree of vitality with the minimum amount of water. It is for this reason that the grain does not receive more water than it requires in order that this object should be pursued and achieved in the minimum time. When the maximum level of vitality is reached, the grain no longer receives any water which it would very soon require for the continuation of the germination process. The grain accordingly enters into the full solubilization stage and the respiratory process is thus caused to fall off rapidly, thereby reducing the malting loss.

In order to obtain the maximum desired quantity of enzymes with the minimum quantity of water, it is essential to ensure optimum conditions under which the grain is supplied with oxygen and carbon dioxide. These conditions are easily satisfied by virtue of the device which has been described above, or by means of any like device which provides immersion for a very short time, while the spraying treatment permitted by means of the said device is very uniform and homogeneous since it is effected when the grain is disposed in a fine layer. In short, every effort is made at the outset to produce germination of the grain with the maximum vital activity, thereby resulting in a substantial development of enzymes. After formation of the enzymes, it is then possible to reduce germination by virtue of a moisture content which is best suited to this purpose, which in turn results in a reduction in the rootlets while the biochemical activity remains satisfactory.

It should be noted that the fact of being able to increase the moisture of the grain at will during the solubilization phase is also a favorable factor.

I desire to have it understood that, within the scope of the appended claim, the invention may be practiced otherwise than as specifically illustrated and described.

I claim:

Device for a combined steeping and germinating multiprocess comprising a germinating bin, means including a continuous movement bucket chain having a horizontal top run for displacing the grain in said bin in such manner that the said grain circulates in a small volume; and means including a first series of water sprayers for moistening the grain in the buckets of said bucket chain in the top run area thereof, and a second series of water sprayers for moistening the grain during the free drop of the same after discharge from the buckets of said bucket chain for moistening the grain during its displacement.

References Cited by the Examiner

UNITED STATES PATENTS

| | | | |
|---|---|---|---|
| 283,494 | 8/83 | Kropff | 195—30 |
| 1,883,800 | 10/32 | Krider | 23—270 |
| 2,671,045 | 3/54 | Ruzicka | 195—129 |
| 2,722,474 | 11/55 | Hanke et al. | 23—270 |
| 2,933,435 | 4/60 | Graff et al. | 195—129 |
| 2,991,231 | 7/61 | Lucht et al. | 195—70 |
| 3,014,847 | 12/61 | Kneen et al. | 195—70 |
| 3,113,027 | 12/63 | Learner et al. | 99—52 |

A. LOUIS MONACELL, *Primary Examiner.*

ABRAHAM H. WINKELSTEIN, *Examiner.*